Figure 5:
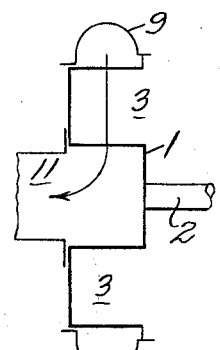

Dec. 29, 1959         D. W. TRYHORN         2,919,062
ROTARY COMPRESSING, DISPLACING OR EXPANDING MACHINE
Filed Oct. 3, 1955         6 Sheets—Sheet 1
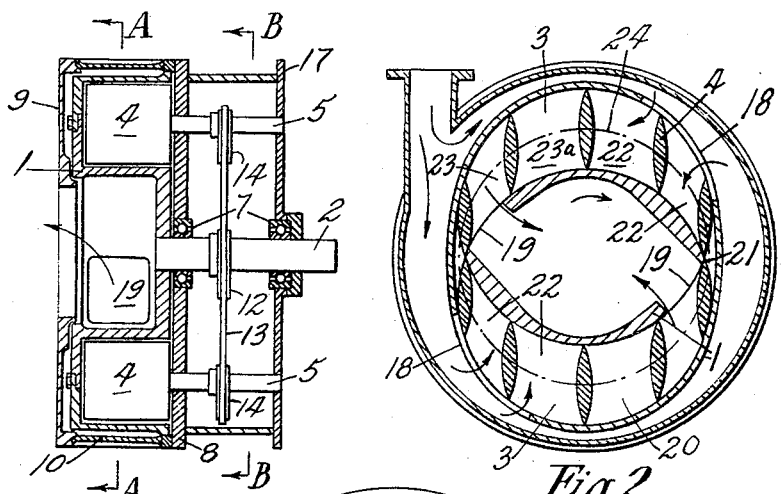
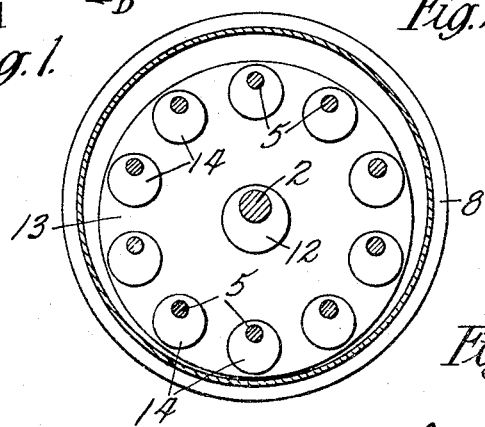

Dec. 29, 1959  D. W. TRYHORN  2,919,062
ROTARY COMPRESSING, DISPLACING OR EXPANDING MACHINE
Filed Oct. 3, 1955  6 Sheets-Sheet 2

Inventor:
Donald Wilfred Tryhorn
by
Attorney

Dec. 29, 1959   D. W. TRYHORN   2,919,062
ROTARY COMPRESSING, DISPLACING OR EXPANDING MACHINE
Filed Oct. 3, 1955   6 Sheets-Sheet 3

Inventor:
Donald Wilfred Tryhorn
by
Attorney

Dec. 29, 1959     D. W. TRYHORN     2,919,062
ROTARY COMPRESSING, DISPLACING OR EXPANDING MACHINE
Filed Oct. 3, 1955     6 Sheets-Sheet 4

Inventor:
Donald Wilfred Tryhorn
by
Attorney

United States Patent Office 2,919,062
Patented Dec. 29, 1959

2,919,062

ROTARY COMPRESSING, DISPLACING OR EXPANDING MACHINE

Donald Wilfred Tryhorn, Slough, England, assignor to The British Internal Combustion Engine Research Association, Slough, England Application October 3, 1955, Serial No. 538,190

Claims priority, application Great Britain October 5, 1954

6 Claims. (Cl. 230—140)

This invention relates to rotary compressing, displacing or expanding machines, particularly those designed to operate over moderate pressure ratios and having revolving pistons with control blades.

The invention consists in a revloving piston machine comprising a stationary hollow casing, a rotor supported in bearings for rotation in said casing, at least one working chamber having inlet and delivery spaces and sealing means therefor that at all times form a partition between the said spaces, said working chamber being bounded by walls formed by said rotor, said casing and said sealing means, and having a zone of maximum cross-sectional area and a zone of minimum cross-sectional area, at least the latter zone and inlet port means on the trailing side and delivery port means on the leading side of the said latter zone being formed in the rotor, the revolving zone of minimum cross-sectional area acting like a piston causing induction through said inlet port means and delivery through said delivery port means.

The present invention provides an improved mechanical construction, whereby it may be run at higher speeds and with less friction loss than other blade type machines. A separate revolving member is arranged to run around the blades and within the stationary hollow casing and/or across the face of the blades. As the axes of the blades are stationary they run free from the loading effects of centrifugal force, which in previously proposed constructions cause the blades to bear hard on their bearings and give high frictional losses. In the previous constructions the blades and supporting shafts deflected when subjected to centrifugal loads and made it necessary to provide large clearances between the blades and the walls of the working chamber or chambers. The leakage through these clearances reduced the efficiency of the machine. The deflection also made it difficult to maintain the accuracy of the phasing mechanism which keeps the blades in the correct rotational relationship to the walls of the working chamber or chambers through which they travel.

In one proposed arrangement the rotor member which runs around the blades and within the casing contains the working chambers of varying cross-sectional area and on rotation causes these working spaces to pass around the blades which run in bearings in the casing and rotate about their own axes as controlled by a synchronising mechanism. This rotor is subject to the centrifugal loading which in previous designs has been taken by the blades but because it contains no separate working mechanisms this force is restrained by a continuity of material throughout the rotor and does not give any loading on bearings. By its shape the rotor can resist centrifugal forces with very little distortion and so maintains a good seal with the blades. Ports cut in the walls of the rotary member are used to control the inlet and delivery processes.

Figure 12:
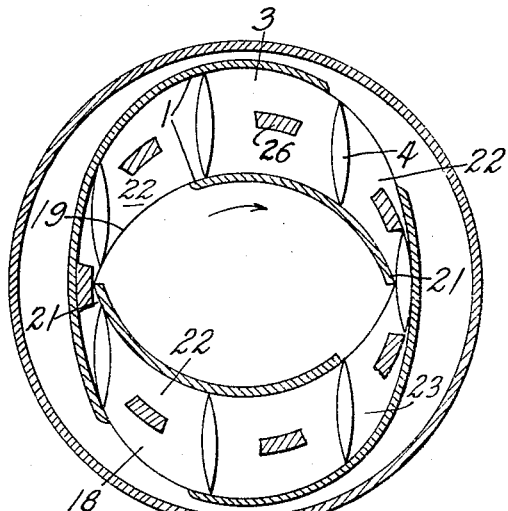
Figure 16:
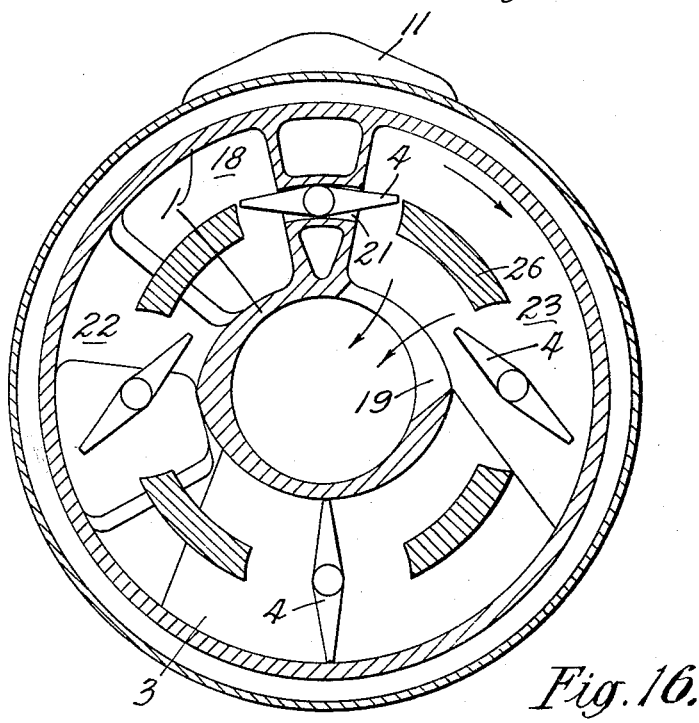
Figure 13:
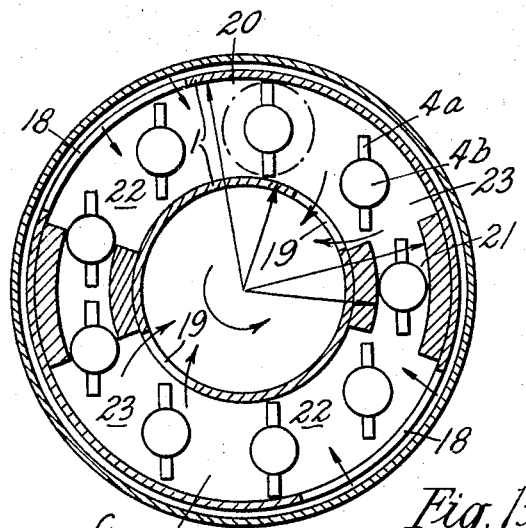
Figure 15:
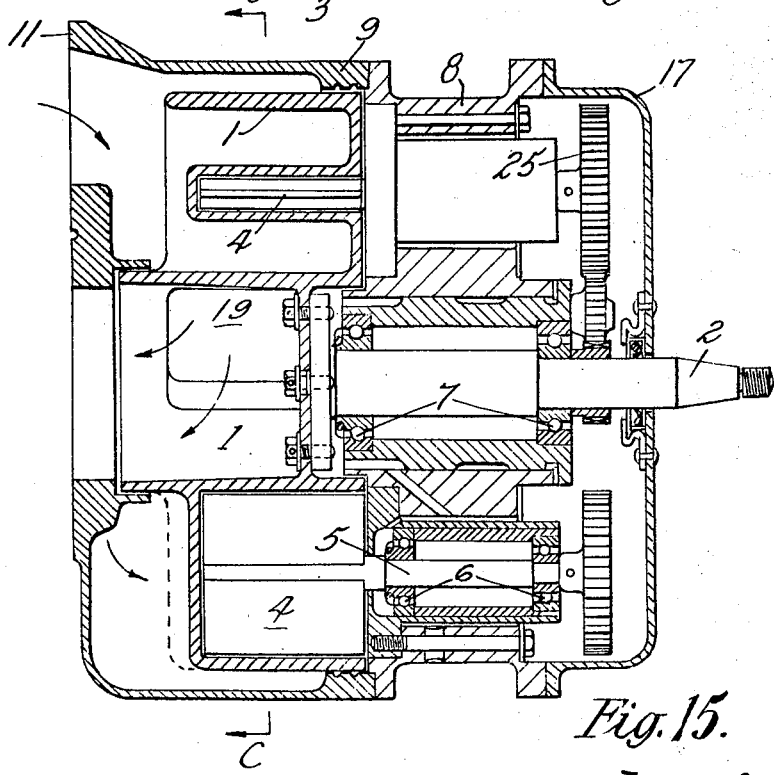
Figure 14:
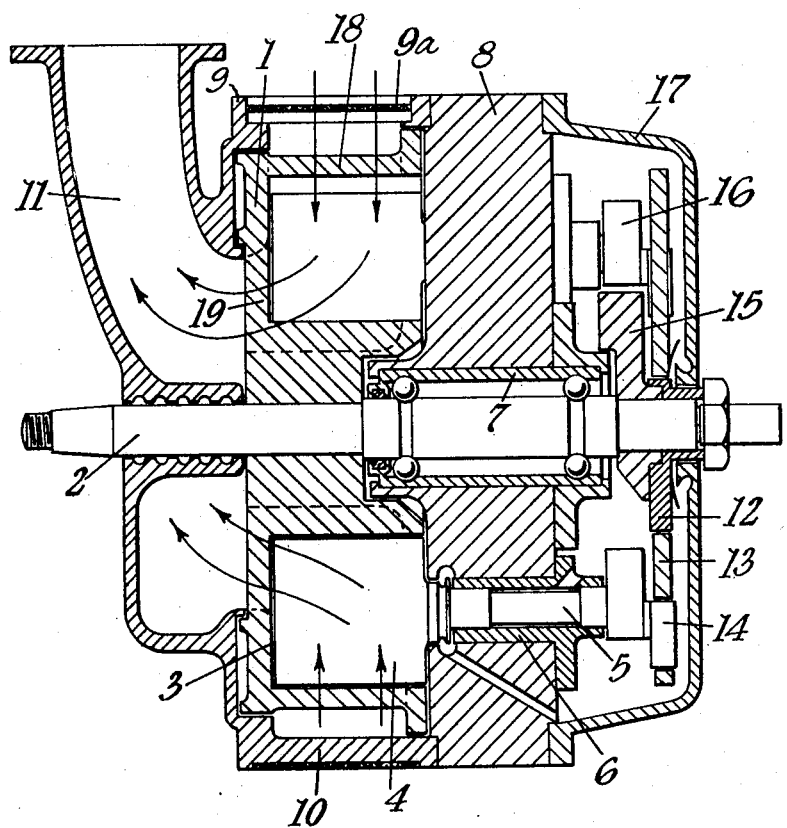
Figure 17:
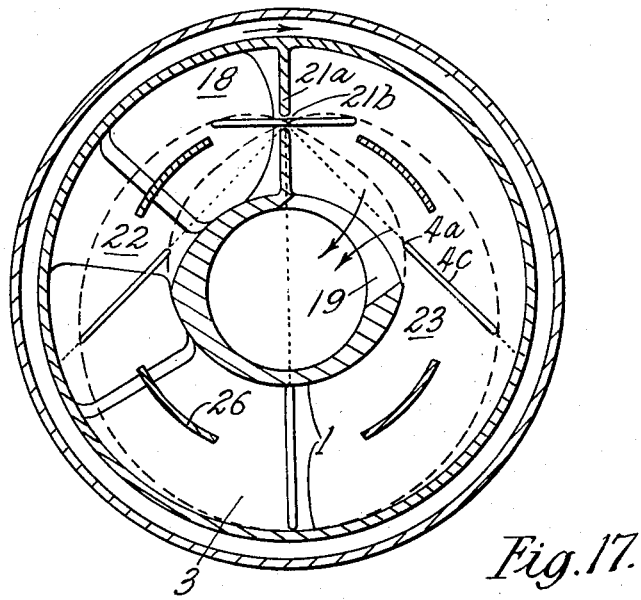
Figure 18:
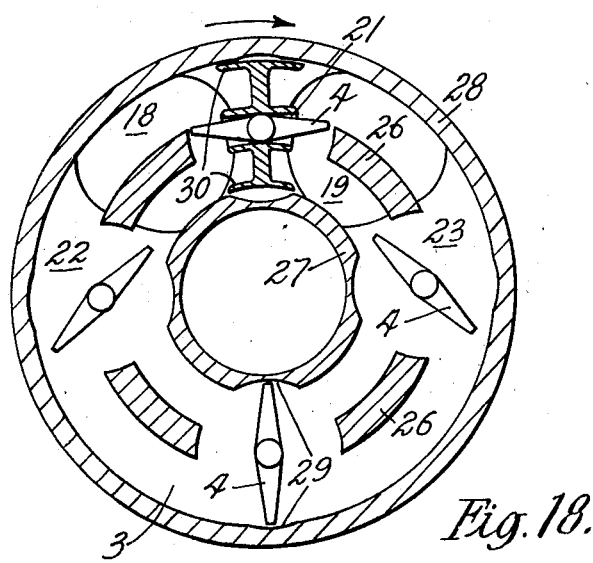

The accompanying drawings show, by way of example only, a number of embodiments of the invention in which:

Figure 1 shows a cross section of one form of the machine;

Figure 2 is a section taken on the line A—A, and Figure 3 on the line B—B of Figure 1, Figures 4–11 show various details of duct and port arrangements applicable to the machine, Figure 12 shows the use of spacing pieces between the blades, Figure 13 shows the use of a modified form of blades within an annular working chamber, Figure 14 is a cross section showing the principal components of a two-cycle machine having an eccentric drive for the blades, Figure 15 is a cross-section showing the principal components of a single-cycle machine, including a typical gear drive for the blades, Figure 16 shows the arrangement of a single-cycle machine with spacing pieces between the blades, Figure 17 shows the arrangement of a machine having thin blades and a small minimum cross sectional area of the working chamber, and Figure 18 shows an alternative arrangement of the stationary and rotating parts.

In accordance with one embodiment of the invention as shown in Figures 1, 2 and 3 the divergent convergent working chamber 3, or a number of such working chambers, are formed so that the centre line through the mid maximum and minimum sections 20, 21, is circular, and the blades 4 are arranged to rotate about axes lying on the blade-axes circle 24, as shown in Figure 2. In this arrangement the space between each two blades carries out the required cycle twice during one revolution of the rotor 1 containing the annular divergent convergent working chambers. In this arrangement phasing is maintained by turning the blades 4 and mainshaft 2 at the same speed. Cranks or gears 25 or eccentrics 12, 13, 14 on the rotor 1 and blade shafts 5 can be used to maintain correct phasing as shown in Figure 3. All the power required to perform the compression process is transmitted from the main shaft 2 to the revolving working chambers 3 so that the sole duty of the phasing gear is to turn the blades 4 against bearing friction and windage. For this reason the phasing gear can be relatively light and should give a long life before wear causes excessive clearances. The rotor 1 revolves wthin the stationary casing 8, 9.

The revolving working chamber 3 is of simple construction. For this particular design, the geometrically correct contours of the working chambers 3 are formed by machining the surfaces of the inner and outer walls to the same radius as the circle 24 on which all the blades' axes are located but about different centres. The distance between the centres of these radii is equal to the length of a blade and the centres are equally spaced on diametrically opposite sides of the axes of the rotor 1. The inner surfaces of the working chamber 3 meet at the two sides of the rotor, but the outer surfaces require joining by a further pair of arcs, having a radius equal to the diameter of the blade-axes circle 24 and centred at the inter-section of the inner working surfaces.

The blades which rotate within the working chamber have a thickness equal to the width of the minimum section 21 of the working chamber 3 and the sides may be shaped by arcs having the same radius as that of the blade axis circle 24.

Figure 6:
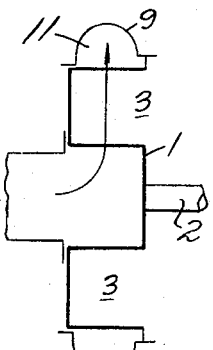
Figure 7:
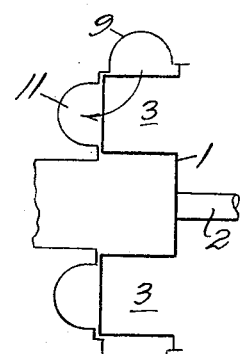
Figure 8:
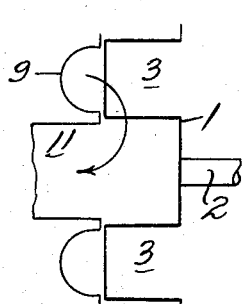
Figure 9:
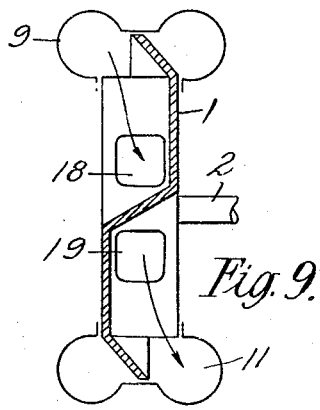
Figure 4:
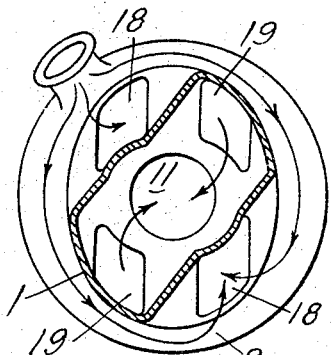
Figures 10, 11:
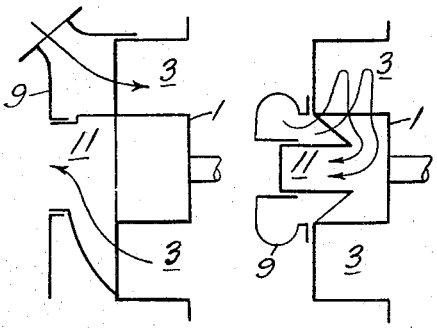

The ports may be cut in any of the moving walls of the working chamber, or any combination thereof, the choice being made by considerations such as achieving the minimum of leakage or to suit the most convenient external ducting. Figures 4–11 show a number of alternatives. Figure 5 shows the duct positions when the air enters through ports in the outer working chamber wall and is delivered through ports in the inner wall. Reversing the direction of rotation of the rotor would reverse the processes as shown in Figure 6. Figures 7 and 8 show use of ports in the working chamber side wall while Figures 9, 10 and 11 show three methods of ducting to suit the condition in which both inlet and delivery ports are cut in the same wall of the working chamber. In each case the duty of the ports may be reversed by reversing the direction of rotation of the rotor. An advantage of a large number of blades is that leakage past a blade is not wasted as it can be arranged that there are always at least three blades sealing so leakage from the first chamber raises the pressure of the air in the next chamber. Only the leakage from the last and lowest pressure chamber leads to the inlet and is wasted.

In Figure 2, the inlet spaces 22 communicate with the outside of the rotor 1, through ports 18, and the delivery spaces 23 communicate with the inside of the rotor 1, through ports 19. Compression takes place in the spaces 23a which are closed to both the inlet port 18 and the delivery port 19.

The main flow of air is radially inward for this particular layout and it is only necessary to change its direction once by 90°, at the centre to take it into the delivery duct. The air pressure loss at bends, therefore, is very small.

The description, so far, has been of the invention in one form. There are, however, a number of arrangements of a series of rotating blades and rotor which work on the same basic principles.

The rotor may contain one or more zones which form the minimum cross sectional area of the working chamber or chambers. If there is only one such zone then the blades have to rotate at half rotor speed or alternatively rock ±90° during the cycle. Cranks may be arranged to give a rocking motion but it is preferable to use a purely rotary motion to avoid acceleration-loads and this may be obtained by a train of spur gears. Compared with the two cycle machine fewer blades may be used for the same degree of inbuilt compression and same delivery port size, but if the walls of the working chamber are to be within sealing distance of the blades throughout the complete cycle, then the said walls cannot be in the form of simple arcs of circles, and the correct geometrical shape would be difficult to machine.

However, it is not essential to the efficient operation of a machine that the walls of the working chamber are within sealing distance of the blades throughout the complete cycle. An air seal must always be maintained at the maximum and minimum cross-sectional area of each working chamber to ensure a continuous seal against leakage of the compressed medium, but in the zones between the maximum and minimum cross-sectional areas a seal is not essential. For example, a working chamber may comprise a zone of minimum cross-sectional area, having a length sufficient to ensure a continuous seal, and another zone having the shape of an annulus of constant cross-sectional area, which is also the maximum cross-sectional area. The seal is made by the blades in the zone of maximum area section but it is not necessary that the blades always form the seal at the minimum area section.

Non-rotating spacing pieces 26 may be inserted between the blades 4 as shown in Figure 12 which form a seal at the minimum area sections 21 only. These permit greater pitch separation between the blades 4 and so a fewer number of blades to be used.

Three or more zones of minimum cross-sectional area may be arranged round the rotor providing that a sufficient number of blades be used to maintain seals at the zones of both the maximum and minimum sections of each working space and suitable phasing gearing used for control. Inlet porting 18 must be provided on the trailing side of each zone of minimum cross-sectional area and delivery porting 19 on the leading side thereof.

The two essential seals, at the maximum and minimum area sections 20, 21 can be obtained with other blade shapes than that described so far, for example, as shown in Figure 13. At the maximum section 20 a seal has to be maintained between the blade extremity 4a and the concentric walls of the working chamber 3 over an arc not greatly less than the angular separation of the blades, if blow back is to be avoided. This seal can be obtained by making the extremities 4a of the blades 4 part-cylindrical about the axis of the blade 4, the seal then being similar to that of a roller in an annular channel in which, obviously, rotation of either the roller about its own axis or revolution of the concentric-walled working chamber 3 about its own axis would not alter the clearance between the roller and the walls. Now if the mid-section 46 of the blade 4 is also made part-cylindrical about the axis of the blade 4 it may be compared to a roller of smaller diameter than that equivalent to the extremities 4a. This mid section 4b of the blade 4 forms a seal on concentric walls at the minimum section 21 of the working chamber 3 so again a small angular movement of either air about their own axis does not alter the seal formed between the two parts. With no more than satisfactory seals at the maximum and minimum sections the machine will operate as a displacing machine but will not give internal compression. As a simple machine for low delivery pressure, however, this design offers the great advantage that operation is relatively insensitive to the accuracy of the phasing mechanism and so the production costs should be very low and operation extremely reliable. This design can be further simplified by the utilisation of the spacing pieces 26 previously described. Figure 16 shows these features combined in a single cycle machine where the roller type seal is operative over a smaller arc of blade rotation than for Figure 13.

A unique feature of the construction having only one minimum and one maximum section per rotor and the blades rotating at half rotor speed, is that the locus of the blade tips form a conchoid known as the Limaçon of Pascal which is characterised by the fact that at all times the longitudinal axis of the blades if projected pass through a common point, at the centre of the slot forming the minimum section 21a of the working chamber 3. Because of this characteristic thin parallel-sided blades 4c can pass through a narrow slot 21a in a diaphragm 21b at the minimum section, the slot being of no more than working clearance larger than the thickness of the blade, as shown in Figure 17. This feature can be used to give a machine which has a large ratio of maximum section area 20 to minimum section area 21a and which has no carry over of air through the minimum section 21a. The former makes the machine economical in bulk and the latter reduces noise and increases efficiency, but in this design the phasing gear would have to work with only a small degree of back lash. If this design is used in conjunction with the part-cylindrical blade extremities 4a as described for Figure 13 forming the seal at the maximum section 3 there results a displacement machine in which the inlet process takes place without cyclic changes in the flow rate. The steady flow should result in quiet running and would also make the design well suited to the pumping of liquids.

An alternative rotor and casing design for machines having any number of cycles per revolution is shown in Figure 18. In this design only the minimum section 21 rotates past the blades 4, the seal at the maximum section being made between the blades 4 and stationary inner 27 and outer 28 casings which encloses a concentric working chamber 3 of a radial width less than the length of a blade. These casings 27, 28 are bored 29 locally to the diameter of the blades 4 and on the blade axis so that the blades seal on these bores over a sufficient arc that when one blade breaks seal another makes seal. The minimum section has seals against the casing of sufficient angular extent to cover the blade sealing cutaways so that these do not provide leakage paths from the delivery to the inlet spaces.

The air resistance losses in all these types of machines are very low because of low air velocities and few changes in flow direction. Although the operating speed of the rotor is appreciable giving say 100 ft./sec. velocity of the blade axes circle, during half a revolution of the rotor, the air moves only a distance roughly equal to the length of a blade which equals the greatest width of the working chamber, that is, approximately the blades axes circle's circumference divided by the number of blades where there are no spacing pieces. For 10 blades, therefore, the mean velocity of the air would in this case be radially inwards at approximately 10 ft. per second. An analogy of this process is to compare the sloping walls of the channel with the angle of the tip of a propeller blade. It is well known that the blade tip moves appreciably faster than the flow it produces at right angles to its own direction of travel. The advantage of a compression process involving low air velocities is that pressure change processes which take place within the charge, and occur at the velocity of sound, take place too rapidly to have an appreciable effect on the working cycle.

To ensure a minimum of air loss at the ports it is arranged that during the period of highest demand practically the whole of the flow area between the parallel axis of the blades is used as port. As the demand for air drops towards the end of the inlet period the port is closed slowly so that fresh charge is trapped when the maximum volume has entered the working chamber. When the process is used for a simple displacing machine the delivery port starts to open as soon as the inlet valve is closed. For a compressor the delivery port opens after the position of maximum volume. The later that it is made to open the greater is the amount of inbuilt compression given to the charge before delivery takes place.

By way of example, Figure 14 is a cross sectional diagram showing the principal components. The rotor 1 mounted on the main shaft 2 contains two working chambers of variable cross section 3. Within these working chambers run the blades 4 mounted on spindles 5 which run in bearings 6. These bearings and the bearings 7 which support the mainshaft 2 are supported and located by the back plate 8. The part 9 is provided with an annular air inlet aperture having a built-in filter element in this example the delivery duct portion 11 is part of the same casting the inlet aperture being bridged by the bars 10. The correct phasing of the rotor and blades is maintained by the driving eccentric 12 on the mainshaft which, through the eccentric plate 13, drives the driven eccentrics 14 fixed to the blade spindles 5. 15 is a balance weight to balance the driving eccentric and eccentric plate and 16 are weights to balance the individual driven eccentrics. 17 is a cover to enclose the phasing mechanism. 18 and 19 show the inlet and delivery ports respectively, not truly visible in this section. The machine may be driven from either end but the drive from the rotor end is preferable as the phasing gear is then isolated from any irregularities of driving torque. If the direction of rotation be changed then the duties of the inlet and delivery ports are also changed. Figure 15 is a cross sectional view, similar to Figure 14, but of a single cycle machine, in which the correct phasing is maintained by a gear train 25, instead of eccentrics 12, 13, 14.

It is to be understood that the constructions above described are by way of example only and that details for carrying the invention into effect may be varied without departing from the scope of the invention.

I claim:

1. A revolving piston machine comprising a stationary hollow casing, a rotor supported in bearings for rotation concentrically in said casing, at least one working chamber, which has a zone of minimum cross-sectional area and a zone of maximum cross-sectional area, and which is bounded by walls of said casing and rotor, the latter comprising at least the walls which mutually and equally approach each other to form a revolving piston but to leave a gap which forms said zone of minimum cross-sectional area, and also the wall which contains revolving inlet port means on the trailing side and revolving delivery port means on the leading side of said revolving zone of minimum cross-sectional area, said working chamber being divided into inlet and delivery spaces by sealing means which include a plurality of blades operated in phase with the revolution of said rotor to perform a rotary-like movement about axes which are fixed in relation to the said stationary casing, said rotary-like movement of the blades being arranged in such manner that each blade makes a seal at its maximum diameter and end faces with at least the walls of the zone of maximum cross-sectional area and that each blade in sequence makes a seal at its maximum thickness and end faces with the walls of the zone of minimum cross-sectional area as the latter passes each blade, so that the walls of said rotor which form the revolving zone of minimum cross-sectional area act like a piston and cause induction and delivery through the inlet and delivery port means respectively.

2. A revolving piston machine comprising a stationary hollow casing, a rotor supported in bearings for rotation concentrically in said casing, two working chambers of convergent-divergent shape each of which has a zone of minimum cross-sectional area and a zone of maximum cross-sectional area, and which is bounded by walls of said casing and rotor, the latter comprising the inner and outer peripheral walls which converge to form a revolving piston but to leave a gap which forms said zone of minimum cross-sectional area and diverge to form said zone of maximum cross-sectional area, said peripheral walls also contain revolving inlet port means on the trailing side and revolving delivery port means on the leading side of said revolving zone of minimum cross-sectional area, and the revolving outer axial wall of both said working chambers, the latter being divided into inlet and delivery spaces by a plurality of blades operated in phase with the revolution of said rotor to perform a rotary-like movement about axes which are fixed in relation to the said stationary casing, said rotary-like movement of the blades being arranged in such manner that each blade makes a seal at its maximum diameter with said inner and outer peripheral walls in all positions of said working chamber relative to said blade except where the peripheral walls are cut away to form the inlet and delivery ports, and at its end faces with the revolving outer axial wall and the stationary inner axial wall formed by the stationary casing, and that each blade in sequence makes a seal at its maximum thickness and end faces with the walls of the zone of minimum cross-sectional area as the latter passes each blade, so that the walls of said rotor which form the revolving zone of minimum cross-sectional area act like a piston and cause induction and delivery through the inlet and delivery port means respectively.

3. A revolving piston machine comprising a stationary hollow casing, a rotor supported in bearing for rotation concentrically in said casing, two working chambers of convergent-divergent shape each of which has a zone of minimum cross-sectional area and a zone of maximum cross-sectional area, and which is bounded by walls of said casing and rotor, the latter comprising the inner and outer peripheral walls which converge to form a revolving piston but to leave a gap which forms said zone of minimum cross-sectional area and diverge to form said zone of maximum cross-sectional area, said peripheral walls also contain revolving inlet port means on the trailing side and revolving delivery port means on the leading side of said revolving zone of minimum cross-sectional area, and the revolving outer axial wall of both of said working chambers, the latter being divided into inlet and delivery spaces by a plurality of blades operated in phase with the revolution of said rotor to perform a rotary-like movement about axes which are fixed in relation to the said stationary casing, said rotary-like movement of the blades being arranged in such manner that each blade makes a seal at its maximum diameter with said inner and outer peripheral walls in all positions of said working chamber relative to said blade except where the peripheral walls are cut away to form the inlet and delivery ports, and at its end faces with the revolving outer axial wall and the stationary inner axial wall formed by the stationary casing, and a plurality of concentric spacing pieces positioned between and on the same pitch circle as the blades, having a thickness equal to the radial width of the zone of minimum cross-sectional area and a circumferential length equal to the circumferential distance between the tips of adjacent blades, and that a seal is made at the zone of minimum cross-sectional area by the maximum thickness and end faces of each blade and by the said spacing pieces alternately and in sequence as the zone of minimum cross-sectional area passes each blade and spacing piece, so that the walls of said rotor which form the revolving zone of minimum cross-sectional area act like a piston and cause induction and delivery through the inlet and delivery port means respectively.

4. A revolving piston machine comprising a stationary hollow casing, a rotor supported in bearings for rotation concentrically in said casing, two working chambers of annular shape, each of which has a zone of minimum cross-sectional area and a zone of maximum cross-sectional area, and which is bounded by walls of said casing and rotor, the latter comprising the concentric inner and outer peripheral walls which form the zone of maximum cross-sectional area and the radial walls which mutually and equally approach each other to form a revolving piston but to leave a gap which forms said zone of minimum cross-sectional area, and the revolving outer axial wall of both said working chambers, said peripheral walls also contain revolving inlet port means on the trailing side and revolving delivery port means on the leading side of said revolving zone of minimum cross-sectional area, said working chamber being divided into inlet and delivery spaces by a plurality of blades operated in phase with the revolution of said rotor to perform a rotary-like movement about axes which are fixed in relation to the said stationary casing, said rotary-like movement of the blades being arranged in such manner that at the middle of the zone of maximum cross-sectional area each blade in sequence makes a seal on the diameter of its maximum cylindrical portion and its end faces with the inner and outer peripheral walls and the revolving and stationary end walls thereof and that each blade in sequence makes a seal on the diameter of its minimum cylindrical portion and its end faces with the peripheral and end walls of the zone of minimum cross-sectional area as the latter passes each blade, so that the walls of said rotor which form the revolving zone of minimum cross-sectional area act like a piston and cause induction and delivery through the inlet and delivery port means respectively.

5. A revolving piston machine comprising a stationary hollow casing, a rotor supported in bearings for rotation concentrically in said casing, one working chamber of substantially annular shape which has a zone of minimum cross-sectional area and a zone of maximum cross-sectional area, and which is bounded by walls of said casing and rotor, the latter comprising the inner and outer substantially circumferential walls which form the zone of maximum cross-sectional area and the radial walls which mutually and equally approach each other to form a revolving piston but to leave a gap which forms said zone of minimum cross-sectional area, and the revolving outer axial wall of the working chamber, said revolving inner circumferential and outer axial walls respectively contain revolving inlet port means on the trailing side and revolving delivery port means on the leading side of said revolving zone of minimum cross-sectional area, said working chamber being divided into inlet and delivery spaces by a plurality of blades operated in phase with the revolution of said rotor to perform a rotary-like movement about axes which are fixed in relation to the said stationary casing, said rotary-like movement of the blades being arranged in such manner that at the middle of the zone of maximum cross-sectional area each blade in sequence makes a seal at its tips and end faces with the revolving circumferential and revolving and stationary end walls thereof and a plurality of concentric spacing pieces positioned between and on the same pitch circle as the blades, having a thickness equal to the radial width of the zone of minimum cross-sectional area and circumferential length equal to the circumferential distance between the tips of adjacent blades, and that a seal is made at the zone of minimum cross-sectional area by the maximum thickness and end faces of each blade and by the said spacing pieces alternately and in sequence as the zone of minimum cross-sectional area passes each blade and spacing piece, so that the walls of said rotor which form the revolving zone of minimum cross-sectional area act like a piston and cause induction and delivery through the inlet and delivery port means respectively, 6. A revolving piston machine comprising a stationary hollow casing, a rotor supported in bearings for rotation concentrically in said casing, one working chamber of substantially annular shape which has a zone of minimum cross-sectional area and a zone of maximum cross-sectional area, and which is bounded by walls of said casing and rotor, the latter comprising the radial walls which mutually and equally approach each other to form a revolving piston but to leave a gap which forms said zone of minimum cross-sectional area, and the revolving outer axial wall of the working chamber, said outer axial wall contains revolving inlet port means on the trailing side and revolving delivery port means on the leading side of said revolving zone of minimum cross-sectional area, and the inner and outer substantially circumferential walls which form the zone of maximum cross-sectional area are contained in the said stationary casing, said working chamber being divided into inlet and delivery spaces by a plurality of blades operated in phase with the revolution of said rotor to perform a rotary-like movement about axes which are fixed in relation to the said stationary casing, the radial width of the working chamber is less than the maximum diameter of a blade and the stationary circumferential inner and outer walls of the chamber are bored locally to the diameter of the blades and on the blade axes, said rotary-like movement of the blades being arranged in such manner that at the middle of the zone of maximum cross-sectional area each blade in sequence makes a seal at its tips with said local boring over an arc which when the rotary-like movement of the blade occurs, is sufficient to ensure that when one blade breaks seal another makes seal, the end faces of the blades making a seal with the revolving and stationary end walls of the working chamber, and a plurality of concentric spacing pieces positioned between and on the same pitch circle as the blades, having a thickness equal to the radial width of the zone of minimum cross-sectional area and circumferential length equal to the circumferential distance between the tips of adjacent blades, and that a seal is made at the zone of minimum cross-sectional area by the maximum thickness and end faces of each blade and by the said spacing pieces alternately and in sequence as the zone of minimum cross-sectional area passes each blade and spacing piece, so that the walls of said rotor which form the revolving zone of minimum cross-sectional area act like a piston and cause induction and delivery through the inlet and delivery port means respectively.

References Cited in the file of this patent

UNITED STATES PATENTS

| Number | Name | Date |
|---|---|---|
| 153,202 | Pruett | July 21, 1874 |
| 1,101,329 | Reaugh | June 23, 1914 |
| 1,136,976 | Reaugh | Apr. 27, 1915 |
| 1,394,861 | Reaugh | Oct. 25, 1921 |
| 1,524,447 | Molinari | Jan. 27, 1925 |
| 1,565,401 | Schaeren | Dec. 15, 1925 |
| 2,181,962 | Booth | Dec. 5, 1939 |
| 2,341,710 | Gingrich | Feb. 15, 1944 |
| 2,397,139 | Heaton | Mar. 26, 1946 |
| 2,416,396 | Landrum | Feb. 25, 1947 |
| 2,495,760 | Pinkel | Jan. 31, 1950 |

FOREIGN PATENTS

| Number | Country | Date |
|---|---|---|
| 49,079 | Sweden | May 4, 1921 |
| 484,429 | France | July 9, 1917 |